(12) United States Patent
Gerber et al.

(10) Patent No.: US 7,881,552 B1
(45) Date of Patent: Feb. 1, 2011

(54) ANTI-FLICKER FILTER

(75) Inventors: Richard Gerber, San Mateo, CA (US); Daniel McCormick, Kitchener (CA)

(73) Assignee: Adobe Systems Incorporated, San Jose, CA (US)

( * ) Notice: Subject to any disclaimer, the term of this patent is extended or adjusted under 35 U.S.C. 154(b) by 1296 days.

(21) Appl. No.: 11/435,162

(22) Filed: May 16, 2006

(51) Int. Cl.
*G06K 9/40* (2006.01)

(52) U.S. Cl. ..................... 382/264; 382/236; 382/275

(58) Field of Classification Search .............. 348/226.1, 348/447, E5.11, 910, FOR. 203; 382/236, 382/264, 275
See application file for complete search history.

(56) References Cited

U.S. PATENT DOCUMENTS

| | | | | |
|---|---|---|---|---|
| 5,204,741 | A * | 4/1993 | Sakaguchi | 348/208.6 |
| 6,192,079 | B1 * | 2/2001 | Sharma et al. | 375/240.16 |
| 6,421,097 | B1 * | 7/2002 | O'Rourke | 348/607 |
| 7,064,790 | B1 * | 6/2006 | Varma et al. | 348/441 |

OTHER PUBLICATIONS

"Making Computer Videos" (visited Jun. 27, 2006) <http://www.wilsonmar.com/1videos.htm>.

* cited by examiner

*Primary Examiner*—Bhavesh M Mehta
*Assistant Examiner*—Gregory F Cunningham
(74) *Attorney, Agent, or Firm*—Robert C. Kowert; Meyertons, Hood, Kivlin, Kowert & Goetzel, P.C.

(57) ABSTRACT

An anti-flicker filter is described, including determining a video sequence based on designated portion of a video, selecting a plurality of video elements from the video sequence, calculating an individualized filter for each video element of the plurality of video elements based on motion in each video element, and applying the individualized filter to each video element of the plurality of video elements.

25 Claims, 7 Drawing Sheets

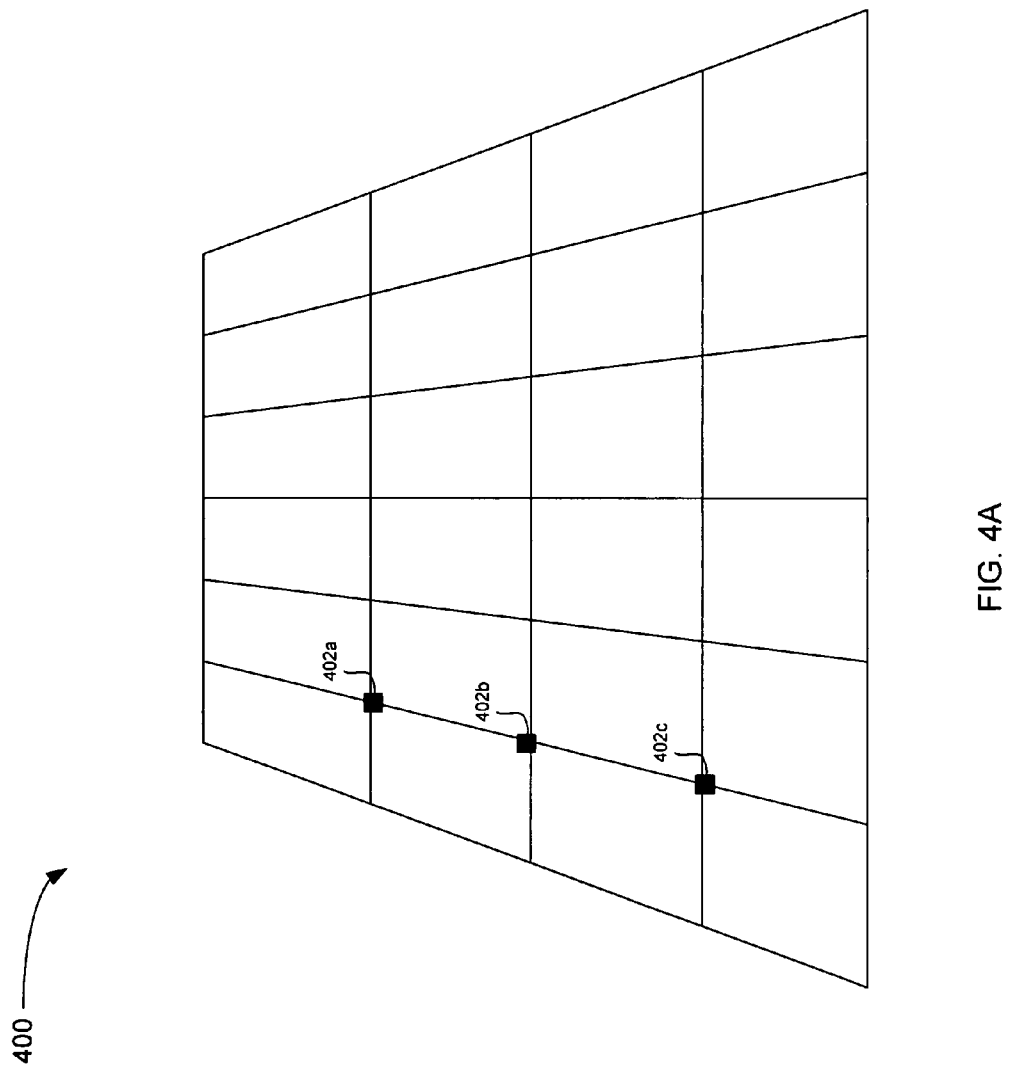

ANTI-FLICKER FILTER

FIELD OF THE INVENTION

The present invention relates generally to software. More specifically, an anti-flicker filter is described.

BACKGROUND OF THE INVENTION

Video comprises a series of still images (i.e., "frames") which, when played in sequence and at an appropriate speed, mimic real-life motion. Video may be encoded according to various standards. For example, video encoded according to the National Television System Committee (NTSC) standard has approximately 30 frames per second of video, each frame comprising approximately 480 horizontal lines of visual information.

Video may be progressive or interlaced. Progressive video displays all of the lines of a frame at the same time. Interlaced video comprises two fields per frame, or approximately 60 fields per second when using the NTSC standard. Each frame therefore comprises two fields, a first field having half of the horizontal lines of the frame (e.g., the even lines of the frame), and a second field having the other half of the horizontal lines of the frame (e.g., the odd lines of the frame). A field is drawn in its entirety occupying every other line of the frame followed later in time by the other field that is drawn on the other lines.

Flicker is an undesirable artifact that may be caused by frames displayed on interlaced output devices. Flicker may appear to a viewer as flashing or moving lines and may be more prevalent when certain types of video are displayed. For example, flicker may be more noticeable when a video contains thin lines or small high-contrast features. Flicker may also be noticeable in video sequences containing rotation and scaling. Flicker can be distracting and can be uncomfortable for many viewers.

Thus, what is needed is an anti-flicker filter without the limitations of conventional techniques.

BRIEF DESCRIPTION OF THE DRAWINGS

Various embodiments of the invention are disclosed in the following detailed description and the accompanying drawings:

FIG. 4A illustrates a three-dimensional image which may have an anti-flicker filter applied to it according to an embodiment;

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to an embodiment, an anti-flicker filter is disclosed. The anti-flicker filter may include a user adjustable anti-flicker setting such as a slider in a video editing software or other video editing device. A video sequence, or a designated portion of a video, is determined based on a user input or other selection criterion. Frames (or portions of frames such as fields) within the video sequence are analyzed and an individualized filter for each of the frames (or portion thereof) is calculated. The individualized filter may be calculated based on motion such as rotation within a frame, horizontal scaling within the frame, vertical scaling within the frame, whether a source video is progressive or interlaced and whether an output video is progressive or interlaced. The individualized filter is then applied to the frame (or portion thereof). According to an embodiment, a plurality of frames (or portions thereof) within the video sequence may have an individualized filter applied to them. According to another embodiment, the individualized filter may comprise a low pass filter such as a Gaussian blur.

Video Editing Software

Figure 1:
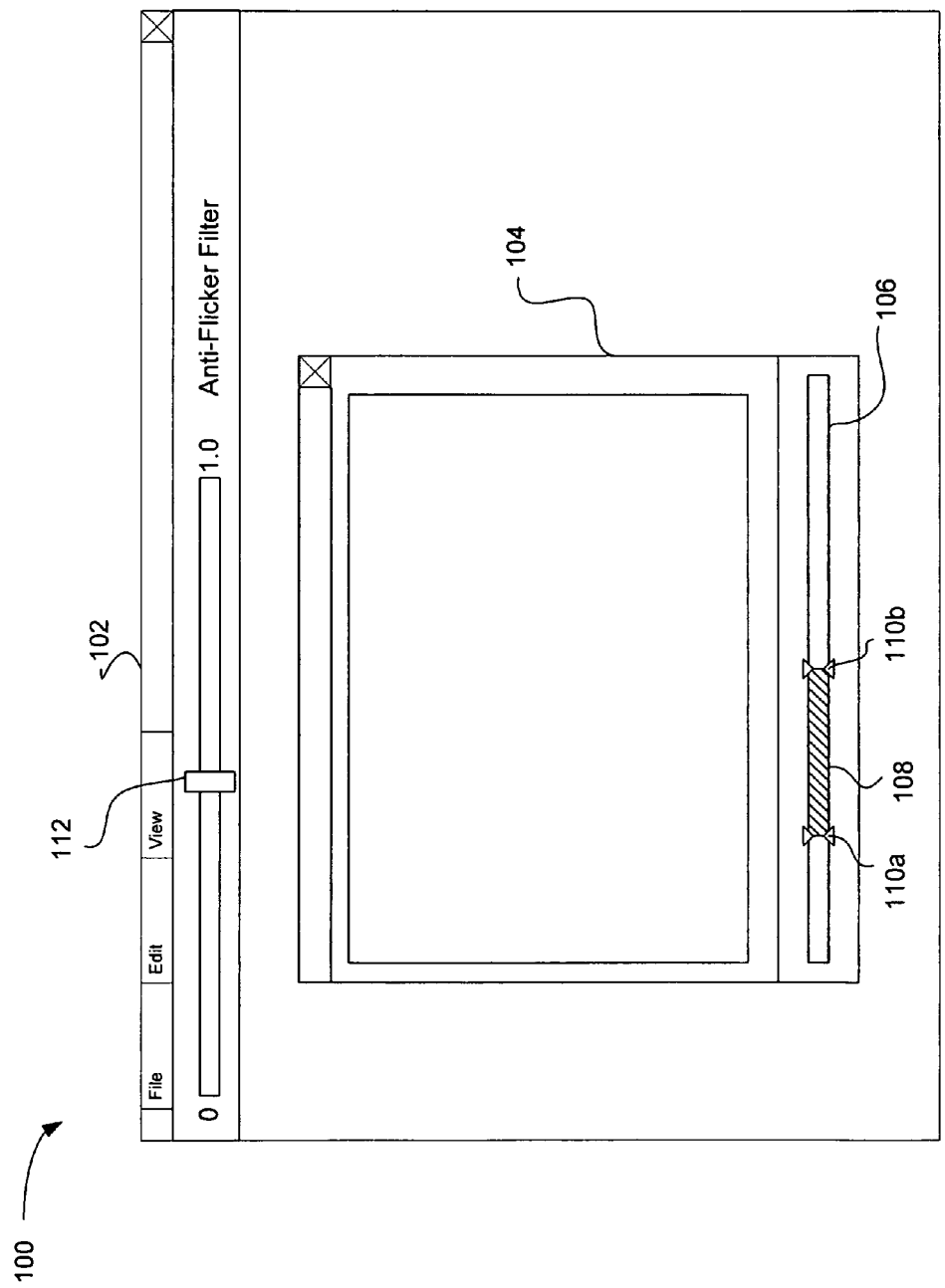
FIG. 1 illustrates video editing software including a slider for adjusting an anti-flicker filter according to an embodiment.

FIG. 1 illustrates video editing software including a slider for adjusting an anti-flicker filter according to an embodiment. Video editing software 100 may be used to generate output video according to a user's specifications. A user can arrange various source materials, such as video clips, audio clips, and still images along a timeline to produce an edited output video. The user may perform various enhancements to the output video using the video editing software 100, including adding visual effects, transitions, splices, and filters. According to an embodiment, an anti-flicker filter can be used to remove undesirable flicker. Although software is described herein, it is understood that an anti-flicker filter may be used with other video editing devices.

The video editing software 100 is displayed in a main window 102 and is operating on a video 104. A timeline 106 may be used to indicate a designated portion of a video to determine a video sequence 108 using markers 110a and 110b. An anti-flicker filter can be activated by selecting a strength of the filter using a slider 112.

For example, the anti-flicker filter may have varying strengths represented by arbitrary values between 0.0 and 1.0, which may be factored into the calculation of the filter applied to each of the frames. The strength of the anti-flicker filter may be used to calculate the magnitude of an individualized filter, for example, the radius of the Gaussian blur, as is explained below. The strength may be a value arbitrarily chosen based on predetermined values that may have been observationally determined. According to an embodiment, when the anti-flicker filter is assigned a value of 1.0, the filtered video sequence may be considered approximately mathematically accurate (i.e., nearly all flicker has been removed). However, to some viewers, this amount of filtering may appear unnecessarily soft or blurry. A certain amount of sharpening, which may be achieved by lowering the strength of the anti-flicker filter (e.g., to 0.6 or 0.7) may improve the appearance of the outputted video. It is understood, however, that for different applications, different values may produce the desired output.

Using the markers 110a and 110b, a user can select the video sequence 108 to which the anti-flicker filter may be applied. The process of applying an anti-flicker filter includes calculating and applying individualized filters for individual frames or portions thereof. An individualized filter, as used herein, refers to a calculated filter that is applied to an individual video element (e.g., a frame, portion of a frame, or a field) that is based on characteristics of that individual video element, which may include motion within the video element relative to other video elements.

Figure 2:
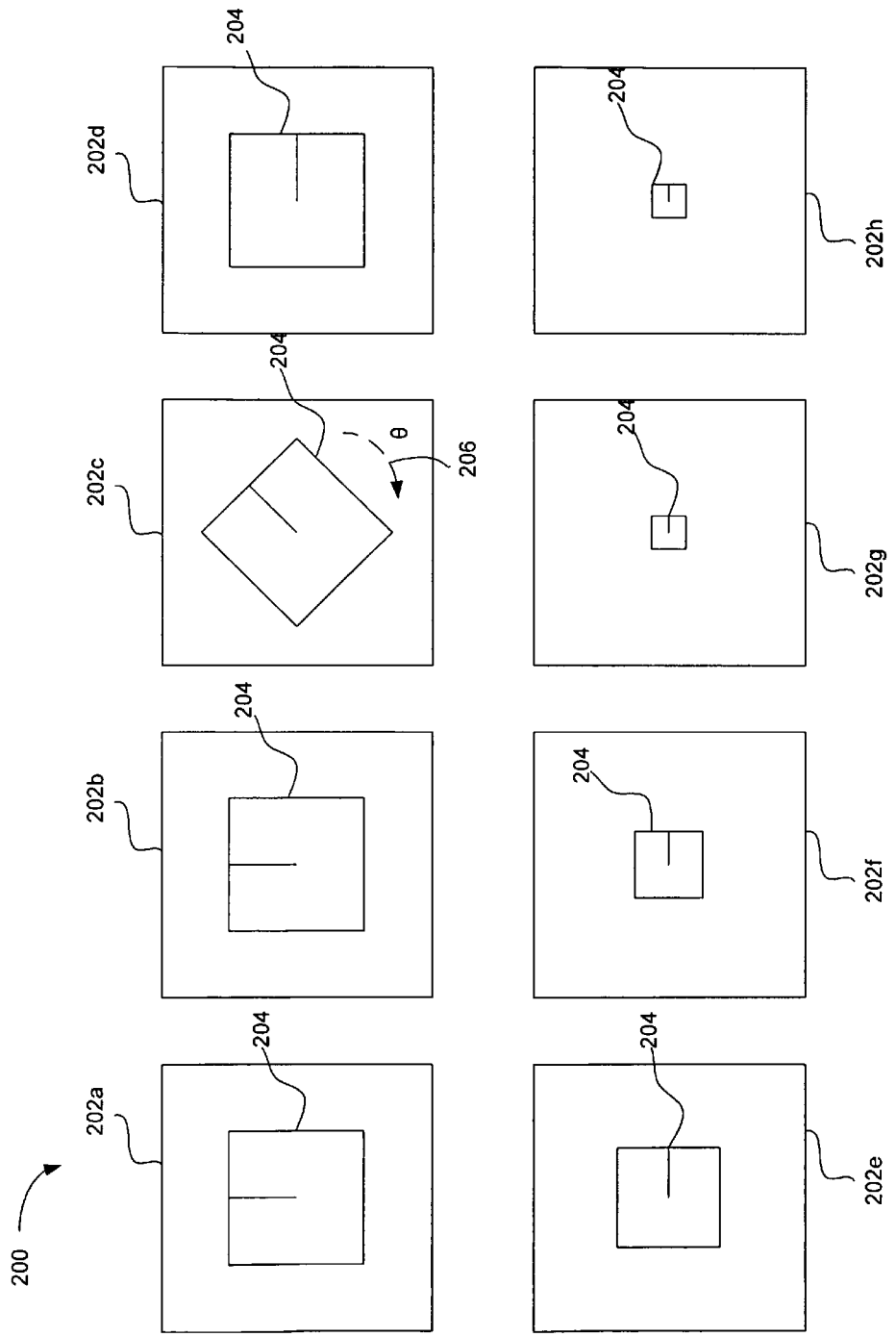
FIG. 2 illustrates an exemplary video sequence, in accordance with an embodiment.

The video sequence 108 may include motion such as rotating or scaling as shown in the video sequence 200 of FIG. 2. The filter may be a low-pass filter such as a Gaussian blur with coefficients that are dependent on scaling in the x-direction (horizontal), scaling in the y-direction (vertical), rotation, and whether or not a source and an output is progressive or interlaced. Examples of determining the coefficients for a Gaussian blur are explained below. Alternatively, other filters such as a sinc filter may be used with the anti-flicker filter.

An Exemplary Video Sequence

FIG. 2 illustrates an exemplary video sequence, in accordance with an embodiment. The video sequence 200 includes a number of frames 202a-202h. According to an embodiment, a filter may be individually calculated for each of the frames 202a-202h. According to another embodiment, a plurality of frames chosen from the frames 202a-202h (e.g., the frames 202b, 202d, and 2020 may be selected from the video sequence 200 for filtering. Selection criteria for determining which frames to filter may be based on user input, a measurable amount of motion in the video sequence 200, and other considerations. By using an individualized filter for a frame (or portion thereof) and accounting for motion within the frame, the anti-flicker filter may create a more acceptable video with less perceptible flicker.

The frames 202a-202h include an object 204 (which may be a still image or other object that may contribute to flicker) that is first rotated in the frames 202b-202d and then scaled in the frames 202e-202g. The frames 202b-202g of the sequence 200 include motion (e.g., rotation or scaling) for which a filter may be applied to reduce flicker. For example, in the frame 202c, the object 204 has been rotated through an angle θ 206, which may be used when calculating the filter for the frame 202c. Additionally, the object 204 has been scaled in the frame 202f by a factor of, for example, 0.8 in both the x- and y-directions. The scaling factor can also be used to calculate the filter for the frame 202f. There may also be frames, for example, where the object 204 may be both rotated and scaled, in which case both factors would be taken into account. Additionally, other factors which could affect the amount of visible flicker in a video sequence could be accounted for when calculating the filter.

The filter may be applied by the video editing software 100. The filter may have, for example, input values (e.g., coefficients), which affect the strength of the filter. For example, a Gaussian blur may have two coefficients, an x-direction coefficient and a y-direction coefficient. The x-direction coefficient affects the radius of the blur in the x-direction and the y-direction coefficient affects the radius of the blur in the y-direction.

According to an embodiment, a user, such as a video editor, may apply an anti-flicker filter to the entire sequence 200. When the anti-flicker filter is processed, an individualized filter is calculated for each of the frames 202a-202h. The motion of an object 204 in the frames 202a-202h changes the parameters of the individualized filter for an individual frame. Several factors may be considered when choosing a filter, including the angle of rotation within the frame (compared to a previous frame), scaling in the x (horizontal) direction, scaling in the y (vertical) direction, whether the input is progressive or interlaced, and whether the output is progressive or interlaced.

The filter may be, for example, a Gaussian blur applied in both the x- and y-directions. The Gaussian blur may specify, for example, a radius in the x-direction and a radius in the y-direction that affects the amount of blurring to an individual frame or portion thereof. The individual radii of the Gaussian blur may be determined using techniques explained in FIGS. 3A and 3B. Alternatively, although low pass filters have been described herein, any filter, such as band pass filters, may also be used where appropriate.

It is further understood that although frames were described regarding the video sequence 200 that portions of frames, such as fields may also have individualized filters applied to them using an anti-flicker filter.

Processes for Calculating and Applying Individualized Filters

Figure 3A:
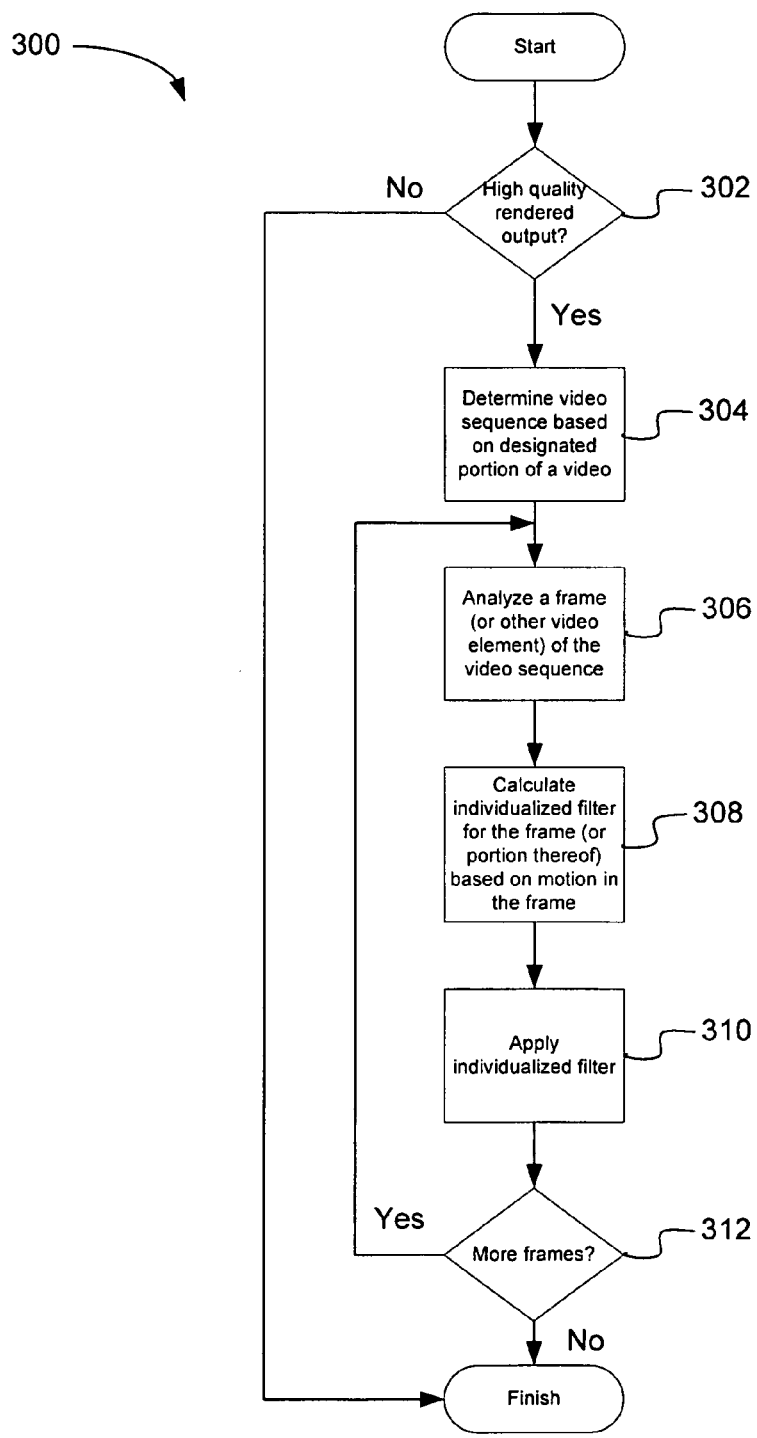
FIG. 3A is a flowchart describing a process 300 for applying an anti-flicker filter to a video sequence according to an embodiment.

FIG. 3A is a flowchart describing a process 300 for applying an anti-flicker filter to a video sequence according to an embodiment. The process 300 may describe the application of individualized filters to frames within the video sequence. The individualized filter may be a low pass filter such as a Gaussian blur, for example, that uses coefficients depending on motion within the video sequence. According to an embodiment, for every frame (or a portion thereof, e.g., a field), or every frame within a selected plurality of frames (or portions of frames) within the video sequence, an individualized filter is calculated, and then applied to the frame or portion thereof.

In block 302, it is determined whether the user has requested high-quality rendering. If not, then process 300 finishes. Alternatively, the process 300 may continue regardless of a user's desired quality setting.

In block 304, a video sequence is determined based on a designated portion of a video. A user or process may designate a portion of a video to be the filtered video sequence using the markers 110a and 110b shown in FIG. 1, for example. A user may determine the video sequence for applying the anti-flicker filter by examining the entire video and determining which areas of the video have undesirable flicker. The sequence may also be determined using an automated process such as a process that analyzes an entire video to determine areas of undesirable flicker.

Additionally, a plurality of frames (or video elements) within the video sequence may be chosen. For example, every other frame within the video sequence may be chosen to comprise the plurality of frames to which individualized filters are applied.

In block 306, a frame of the video sequence is analyzed. For convenience, the following process describes various operations on a frame, however, it is understood that any video element, such as a frame, a portion of a frame or a field may be operated on. The analysis may determine several characteristics of the frame relative to the video sequence. For example, the analysis may determine the angle of rotation of an object within the frame (e.g., the angle θ 206), the amount of scaling occurring within the frame (in both the x- and y-directions, see, e.g., the frames 202e-h), whether the source video is progressive or interlaced, and whether the output is progressive or interlaced. As is explained below, these factors and measurements can be used to determine the strength of the individualized filter to be applied to the frame.

In block 308, an individualized filter based on motion in the frame is calculated for the frame. The individualized filter may be, for example, a Gaussian blur based on a Gaussian distribution such as:

$$G(x) = \frac{1}{\sqrt{2\pi}\,\sigma} e^{-\frac{x^2}{2\sigma^2}} \qquad (1)$$

where σ is the standard deviation of the Gaussian distribution. Filters may receive inputs that relate to the size of a radius of a blur. Additionally, a filter may be applied in both the x- and y-directions (e.g., both horizontally and vertically). The calculations can be used to determine the strength, or radius, of the blur in each direction. Specifics about the calculation of the coefficients that determine the strength of the filter are described in FIG. 3B.

In block 310, the individualized filter is applied to the frame. The individualized filter may be applied using a standard filter function (such as a Gaussian blur) that may already be incorporated into, for example, the video editing software 100. The filter may be applied by inputting filter strengths that were determined in block 308. According to an embodiment, the individualized filter may be applied in both the horizontal and the vertical directions.

In block 312, it is determined whether there is another frame in the video sequence. If there is another frame, the process 300 returns to block 306, where the next frame is analyzed. If every frame in the video sequence has been analyzed, the process 300 finishes.

Figure 3B:
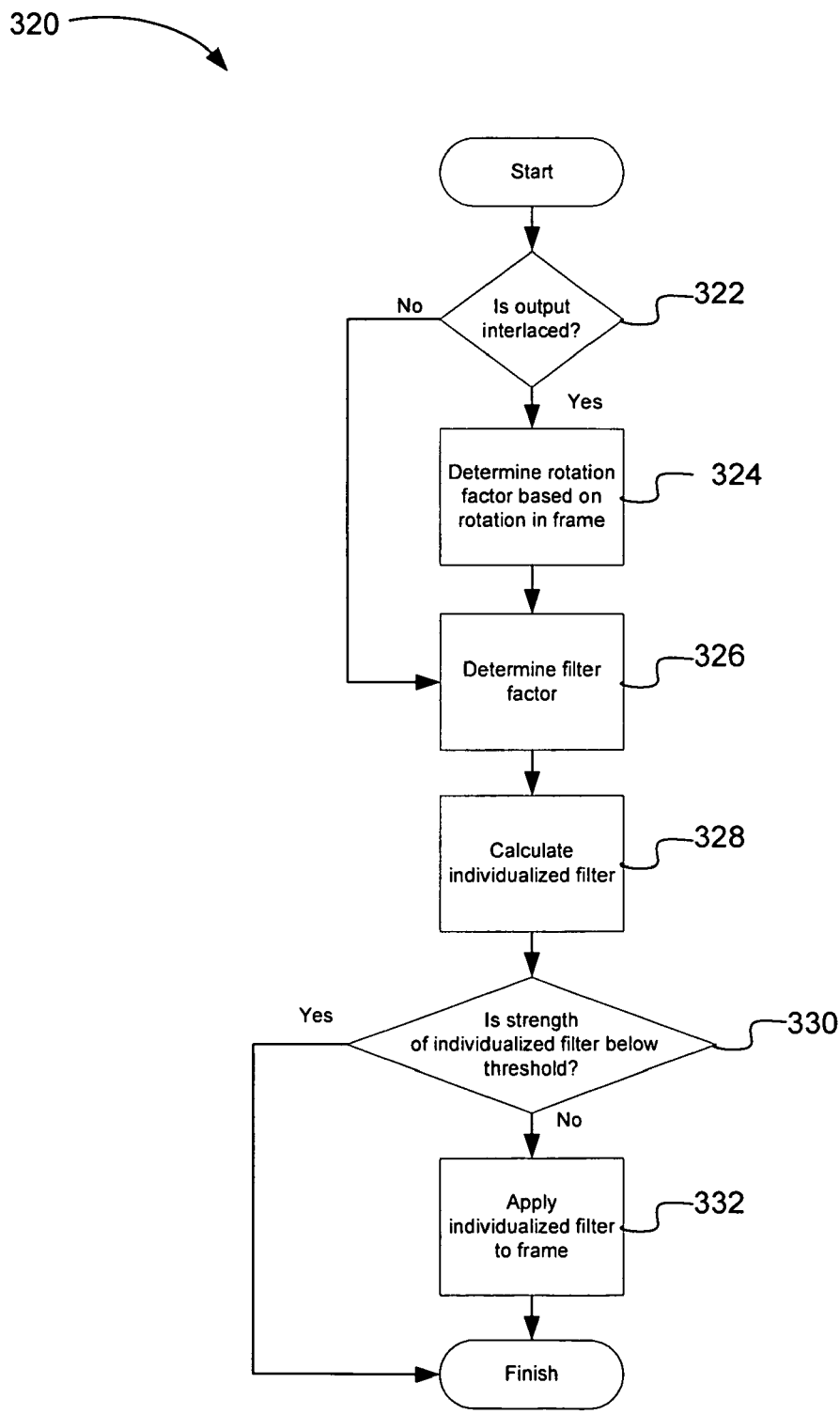
FIG. 3B is a flowchart describing a process for calculating a filter for an individual frame or portion thereof according to an embodiment.

FIG. 3B is a flowchart describing a process for calculating a filter for an individual frame. According to an embodiment, video editing software 100 may calculate coefficients to output to a filter such as a Gaussian blur. The calculation described by the process 320 may be used with block 306 of the process 300. The values derived using the process 320 may be arbitrary values that denote the relative strength or radius of a Gaussian blur or other filter. The process 320 describes the calculation of a two-dimensional filter, although it is understood that a one dimensional or other blur may also be used.

In block 322, it is determined whether the output video is interlaced. If the output video is interlaced, the process continues to block 324. If, in block 322, it is determined that the output is not interlaced, the process 320 continues to block 326. According to an embodiment, rotation present in a video sequence contributes to flicker when an output video is interlaced. In this instance, the amount of rotation present in the sequence may be used to determine an individualized filter.

In block 324, a rotation factor based on a rotation in the frame is determined. According to an embodiment, the rotation factor may be according to the forms of:

$$x_{rotfactor} = |\cos(\theta) - a^*\sin(\theta)| \qquad (2)$$

$$y_{rotfactor} = |\sin(\theta) + a^*\cos(\theta)| \qquad (3)$$

where $x_{rotfactor}$ is the rotation factor used to determine the strength (e.g., radius) of the individualized filter in the x-direction, $y_{rotfactor}$ is the rotation factor used to determine the strength of the individualized filter in the y-direction, θ is the angle of rotation within the frame (e.g., the angle θ 206), and a is the strength of the anti-flicker filter, which may be set using the slider 112, as described above.

According to an embodiment, as an object rotates, the strength of the filter in the x-direction and the strength of the filter in the y-direction shifts. For example, the total magnitude of the individualized filters does not change. Instead, for example, as an object rotates through ninety degrees, the strength of the original object in the x-direction becomes the strength of the new object in the y-direction.

The strength a of the anti-flicker filter may be arbitrarily designated by a user of the video-editing software 100. For example, the strength a may be designated to have a value between 0.0 and 1.0. These values may correspond to other values that are arbitrarily chosen to provide a good compromise so that, for example, when the slider 112 is set to a value of 0.0, the anti-flicker filter is weak, and when the slider 112 is set to a value of 1.0, the anti-flicker filter is strong. In order to accomplish this, the value a may incorporate an arbitrary predetermined factor which is multiplied by the value chosen with the slider 112.

In block 326, a filter factor is determined. The filter factor is based on scaling within the frame in both the x- and y-directions. According to an embodiment, the filter factor may be determined using equation (4) for the x-direction factor and equation (5) for the y-direction factor:

$$x_{filterfactor} = \frac{a}{s_x} \qquad (4)$$

$$y_{filterfactor} = \frac{a}{s_y} \qquad (5)$$

where $x_{filterfactor}$ is the filter factor in the x-direction, $y_{filterfactor}$ is the filter factor in the y-direction, a is the strength of the anti-flicker filter, $s_x$ is the amount of scaling in the x-direction, and $s_y$ is the amount of scaling in the y-direction. The scaling amounts $s_x$ and $s_y$ may be, for example, decimal values that represent the amount of scale. For example, if an object had 80% of its original size in a particular dimension in a subsequent frame, the scaling factor would be 0.8. According to an embodiment, as an object becomes smaller (i.e., as scaling factors decrease), the relative strength of the filter increases.

In block 328, an individualized filter is calculated. As previously, mentioned, an individualized filter may include a blur radius in the x-direction and a blur radius in the y-direction when using a Gaussian blur, for example. If the source is progressive and the output is interlaced, the filter is the product of equations (2) and (4) in the x-direction, and the product of equations (3) and (5) in the y-direction, giving equations (6) and (7), respectively:

$$x_{output} = x_{rotfactor} x_{filterfactor} \quad (6)$$

$$y_{output} = y_{rotfactor} y_{filterfactor} \quad (7)$$

where $x_{output}$ and $y_{output}$ are the values (e.g., coefficients) inputted into a filter, such as a Gaussian blur. In the case where the input is not progressive or the output is not interlaced, it can be assumed that the rotation factor (i.e., $x_{rotfactor}$ or $y_{rotfactor}$) is equal to one.

According to an embodiment, in block 330, a threshold may be established, below which no filter is applied. For example, it may be determined that if both $x_{output}$ and $y_{output}$ are below the threshold, then no filter is applied. This may be useful when applying a filter would make little visible difference to a video sequence, and the amount of computation required to perform the filter would therefore be wasted. If the strength of the individualized filter is below the threshold, the process 320 finishes. If the strength of the individualized filter is greater than the threshold, the process 320 continues to block 334, where the individualized filter is applied to the frame.

According to another embodiment, a filter may accept a vector as input rather than Cartesian input (i.e., strengths in the x- and y-directions). In certain embodiments, a vector value including a magnitude and a direction may provide a more accurate anti-flicker filter. Additionally, it is understood that the filter may also be one-dimensional and accept only a unidirectional input if appropriate.

The process 320 is an example of a process for determining a strength of an individualized filter to apply to a video element, such as a frame or a field, of a video sequence. It is understood that various other processes may also be used, that the equations (2)-(7) are generalized equations and that modifications may be made to the process 320 or any of the equations (2)-(7) where appropriate.

Filters for Three-Dimensional Images

FIG. 4A illustrates a three-dimensional image which may have an anti-flicker filter applied to it according to an embodiment. The three-dimensional image 400 may be part of a three-dimensional video image that includes three-dimensional motion such as a video including a perspective transform of the three-dimensional image 400.

The three dimensional image 400 includes several pixels, for example the pixels 402a, 402b, and 402c. According to an embodiment, an individualized filter may be applied to each pixel in the three-dimensional image 400 to remove aliasing artifacts when motion is introduced. In this embodiment, a stronger filter may be applied to the pixel 402a than to the pixel 402c to remove aliasing artifacts. The pixel 402a is further away than the pixel 402c and therefore may have a stronger filter applied to improve the appearance of the three-dimensional motion.

Figure 4B:
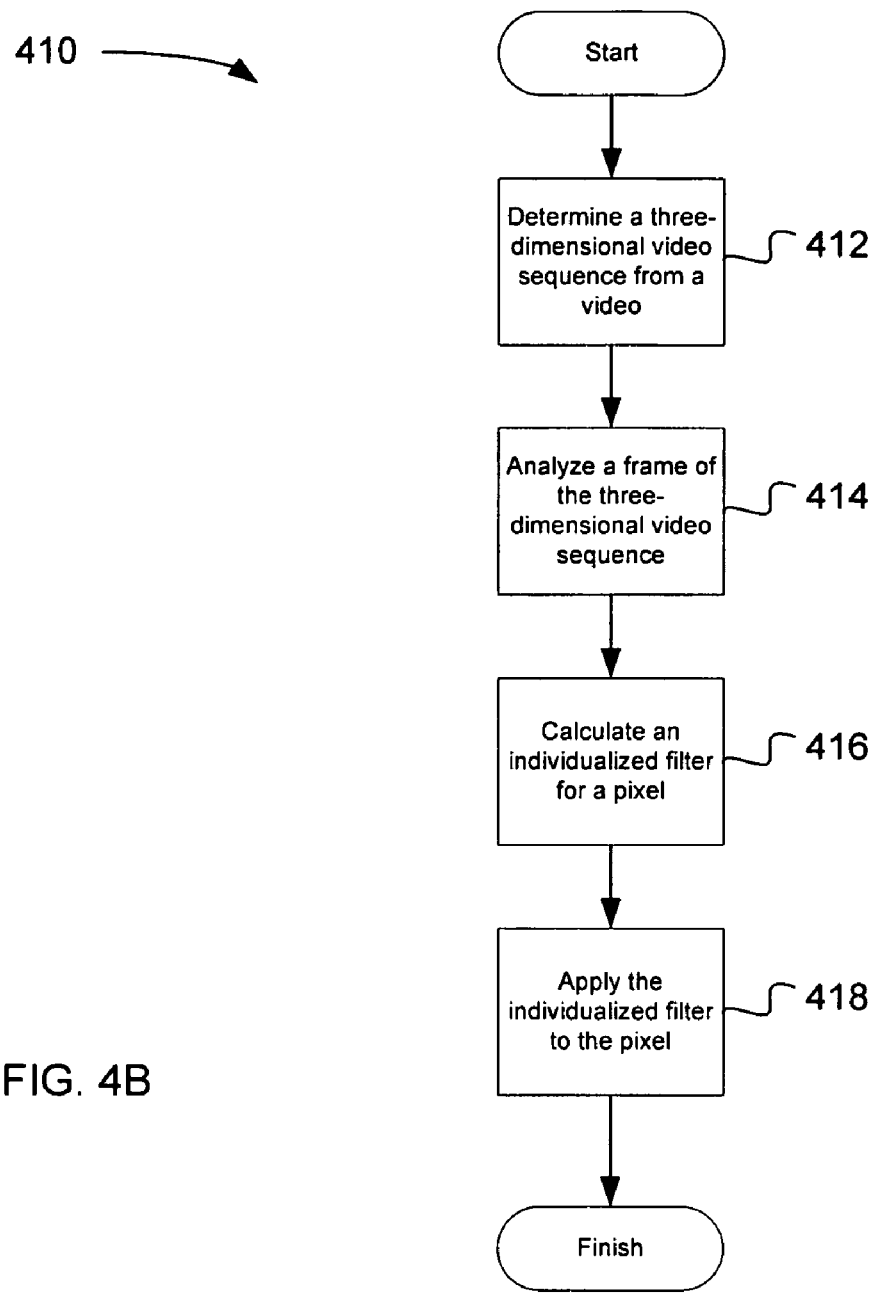
FIG. 4B is a flowchart describing a process 410 for applying an individualized filter to a pixel of a three-dimensional image including motion.

FIG. 4B is a flowchart describing a process 410 for applying an individualized filter to a pixel of a three-dimensional image including motion. In block 412, a three-dimensional video sequence is determined from a video. The three-dimensional video sequence may be one that includes aliasing which may be removed by a filter such as a low pass filter. The three-dimensional video sequence may be determined in response to a user input or a system process.

In block 414, a frame of the three-dimensional video sequence is analyzed. The frame may include several pixels, each of which may have an individualized filter calculated for it. In block 416, an individualized filter is calculated for a pixel. The individualized filter may be, as described above, based on the relative position of the pixel within the frame. According to an embodiment, the strength of the filter may increase as the distance of the pixel from the viewer increases. In block 418, the individualized filter is applied to the pixel. The process 410 may also be performed for other pixels or frames within the three-dimensional video sequence.

An Exemplary Computer System

Figure 5:
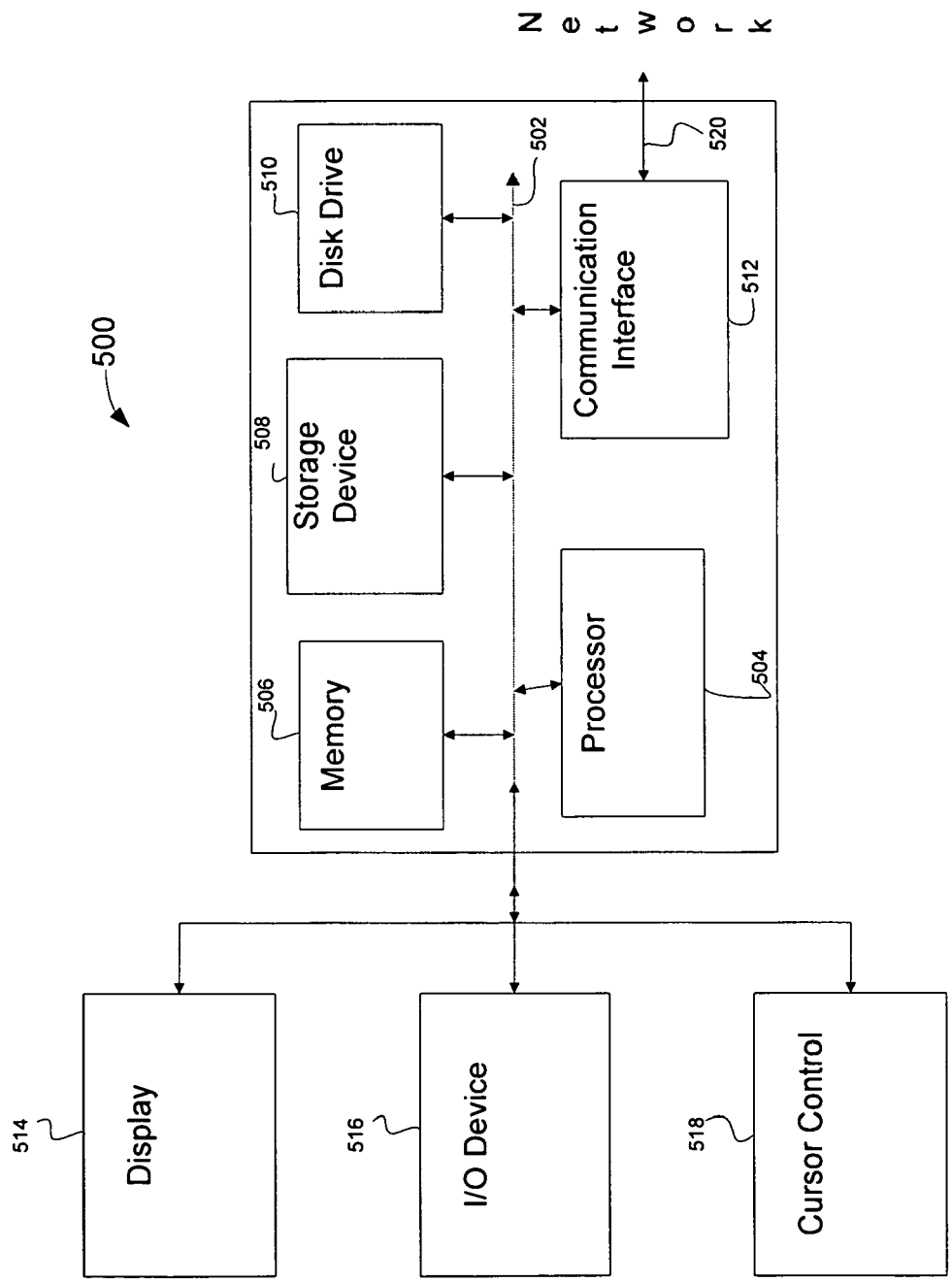
FIG. 5 is a block diagram illustrating an exemplary computer system suitable for an anti-flicker filter, in accordance with various embodiments of the invention.

FIG. 5 is a block diagram illustrating an exemplary computer system suitable for an anti-flicker filter, in accordance with various embodiments of the invention. In some embodiments, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some embodiments of the invention, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some embodiments, hard-wired circuitry may be used in place of or in combination with software instructions to implement the invention.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
    performing by a processor:
        selecting a plurality of individual video frames from a video sequence;
        for each selected individual video frame of the plurality of selected individual video frames:
            determining one or more motion characteristics of the selected individual video frame relative to subsequent frames of the video sequence;
            calculating one or more filter parameters for an individualized filter for the selected individual video frame, wherein the one or more filter parameters are specific to the selected individual video frame, and are based on the one or more determined motion characteristics; and
            applying the individualized filter to the selected individual video frame, wherein said applying is based on the one or more filter parameters that are specific to the selected individual video frame, and wherein said applying attenuates flicker due to the one or more determined motion characteristics.

2. The method of claim 1, wherein the individualized filter is a Gaussian blur.

3. The method of claim 1, wherein the video sequence is interlaced, and said calculating is further based on an amount of rotation in the video sequence.

4. The method of claim 1, wherein said calculating is further based on a user-adjustable anti-flicker setting to control the individual filter's strength.

5. The method of claim 1, wherein the one or more determined motion characteristics depend on rotation or scaling in the video sequence.

6. The method of claim 1, wherein said selecting the plurality of individual video frames comprises selecting every video frame of the video sequence.

7. The method of claim 1, wherein the one or more filter parameters control a horizontal component of the individualized filter and a vertical component of the individualized filter.

8. The method of claim 1, wherein the one or more filter parameters control a magnitude component of the individualized filter and a direction component of the individualized filter.

9. The method of claim 1, wherein the one or more filter parameters control the individualized filter's strength.

10. A system, comprising:
    a memory configured to store a video sequence; and
    a processor configured to perform:
        selecting a plurality of individual video frames from the video sequence;
        for each selected individual video frame of the plurality of selected individual video frames:
            determining one or more motion characteristics of the selected individual video frame relative to subsequent frames of the video sequence;
            calculating one or more filter parameters for an individualized filter for the selected individual video frame, wherein the one or more filter parameters are specific to the selected individual video frame, and are based on the one or more determined motion characteristics; and
            applying the individualized filter to the selected individual video frame, wherein said applying is based on the one or more filter parameters that are specific to the selected individual video frame, and wherein said applying attenuates flicker due to the one or more determined motion characteristics.

11. The system of claim 10, wherein the individualized filter is a Gaussian blur.

12. The system of claim 10, wherein the video sequence is interlaced, and the processor is further configured to perform said calculating based on an amount of rotation in the video sequence.

13. The system of claim 10, wherein the processor is further configured to perform said calculating based on a user-adjustable anti-flicker setting to control the individual filter's strength.

14. The system of claim 10, wherein the one or more filter parameters control the individualized filter's strength.

15. The system of claim 10, wherein the one or more determined motion characteristics depend on rotation or scaling in the video sequence.

16. The system of claim 10, wherein the one or more filter parameters control a horizontal component of the individualized filter and a vertical component of the individualized filter.

17. The system of claim 10, wherein the one or more filter parameters control a magnitude component of the individualized filter and a direction component of the individualized filter.

18. A non-transitory computer readable storage medium storing computer instructions for:
    selecting a plurality of individual video frames from a video sequence;
    for each selected individual video frame of the plurality of selected individual video frames:
        determining one or more motion characteristics of the selected individual video frame relative to subsequent frames of the video sequence;
        calculating one or more filter parameters for an individualized filter for the selected individual video frame, wherein the one or more filter parameters are specific to the selected individual video frame, and are based on the one or more determined motion characteristics; and
        applying the individualized filter to the selected individual video frame, wherein said applying is based on the one or more filter parameters that are specific to the selected individual video frame, and wherein said applying attenuates flicker due to the one or more determined motion characteristics.

19. The non-transitory computer readable storage medium of claim 18, wherein the individualized filter is a Gaussian blur.

20. The non-transitory computer readable storage medium of claim 18, wherein the video sequence is interlaced, and wherein said calculating is based on an amount of rotation in the video sequence.

21. The non-transitory computer readable storage medium of claim 18, wherein said calculating is based on a user-adjustable anti-flicker setting to control the individual filter's strength.

22. The non-transitory computer readable storage medium of claim 18, wherein the one or more filter parameters control the individualized filter's strength.

23. The non-transitory computer readable storage medium of claim 18, wherein the one or more determined motion characteristics depend on rotation or scaling in the video sequence.

24. The non-transitory computer readable storage medium of claim 18, wherein the one or more filter parameters control a horizontal component of the individualized filter and a vertical component of the individualized filter.

25. The non-transitory computer readable storage medium of claim 18, wherein the one or more filter parameters control a magnitude component of the individualized filter and a direction component of the individualized filter.

* * * * *